United States Patent [19]

Freeman

[11] Patent Number: 4,867,469
[45] Date of Patent: Sep. 19, 1989

[54] FRONT MOUNT TRAILER HITCH

[76] Inventor: Paul Freeman, Rte. 2 Box 14, Baxter, W. Va. 26560

[21] Appl. No.: 887,876

[22] Filed: Jan. 20, 1987

[51] Int. Cl.$^4$ ............................................. B60D 1/06
[52] U.S. Cl. .................................................... 280/502
[58] Field of Search ........................ 280/502, 500, 481

[56] References Cited

U.S. PATENT DOCUMENTS

| 2,726,880 | 12/1955 | Klein | 280/502 |
| 3,302,958 | 2/1967 | Fawcett et al. | 280/502 X |
| 4,277,081 | 7/1981 | Stoutenburg | 280/502 |

FOREIGN PATENT DOCUMENTS

| 465530 | 5/1950 | Canada | 280/502 |
| 498820 | 12/1953 | Canada | 280/502 |

OTHER PUBLICATIONS

Advertising Brochure, Atwood Bumper Clamps p. 5, 1/1959.

Primary Examiner—John A. Pekar

[57] ABSTRACT

A bumper hitch for quick and firm connection to the bumper of a variety of vehicles is particularly adapted for connection to the front bumper to allow manuevering or parking of a boat trailer, for example with direct observation by the driver. The hitch includes a vertical member formed of slightly spaced yet connected angles. One leg of the top of each angle is bent horizontally to form a hook to engage the top of the bumper with the other leg of the angle being cut away above the bend. A bottom anchor includes an upturned angle to engage the bottom of the bumper, such angle being secured to a threaded stud extending through the slot so that the bottom anchor may be drawn tight. The interior of the hitch includes a height adjustable wooden pad to protect the bumper finishing. The exterior includes a welded horizontal projection supporting a ball trailer hitch.

5 Claims, 1 Drawing Sheet

FRONT MOUNT TRAILER HITCH

SUMMARY OF THE INVENTION

This hitch is designed as a fast and firm connection to the front bumper of a variety of vehicles to allow exact maneuvering or parking of a trailer such as a boat trailer with direct eye contact by the driver.

The following detailed description will indicate the simplicity of the design and the availability of materials that allows this hitch to be produced at a moderate cost.

DESCRIPTION OF THE PREFERRED EMBODIMENT

Figure 1:
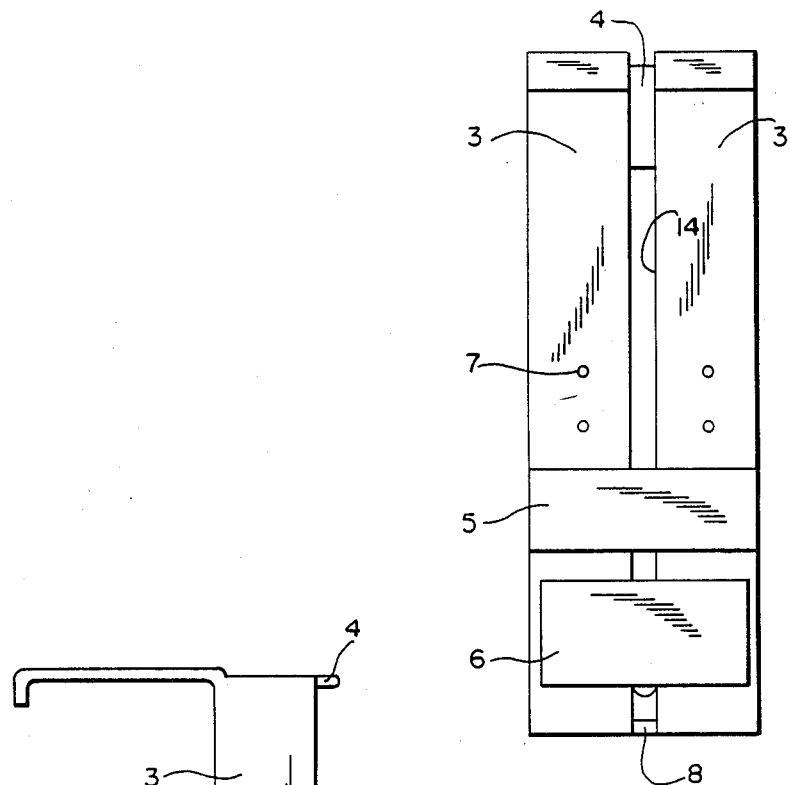
FIG. 1 is a $\frac{3}{8}''$ scaled front elevation, which is the elevation which clamps onto the front bumper.
Figure 2:
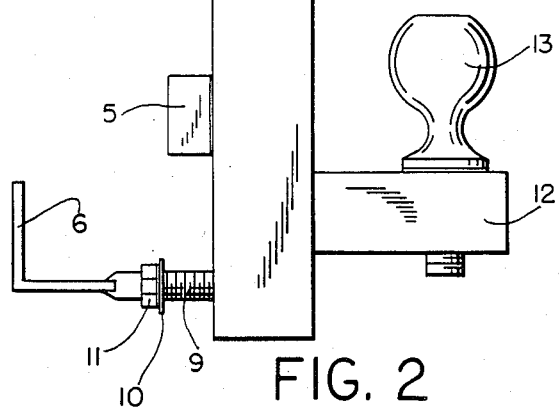
FIG. 2 is a $\frac{3}{8}''$ scaled side elevation showing the top and bottom clamps for the vehicle bumper.

Referring to the attached drawing, the front mount hitch comprises in general two spaced parallel main frames 3 made from $2'' \times 2'' \times \frac{1}{4}'' \times 17''$ long steel angle, with one leg of each angle cut off down $4\frac{3}{4}''$ and the remaining leg is bent in a fashion to create a hook for connecting over the top of a vehicle bumper. The main frames are connected at the top by a piece of $2'' \times 2'' \times \frac{1}{4}''$ steel angle 4 and at the bottom by a $\frac{1}{4}'' \times \frac{1}{4}''$ bar 8 which bridge the slot 14 between the main frames. A $1'' \times 1\frac{1}{2}'' \times 4\frac{1}{2}''$ wood block 5 is provided midway down the frame secured to the main frames by two wood screws to prevent damaging the bumper finish and to maintain a vertical hitch position. Two additional sets of holes 7 are provided for adjustment of the wood block. The adjustable anchor for the connection to the underneath of the bumper is made up of a $2'' \times 2'' \times \frac{1}{4}'' \times 4''$ long angle 6 which is welded to a threaded stud 9 and anchored to the main frames with two nuts 11, one on each side of the slot and one washer 10. A 4'' channel $5\frac{1}{2}''$ long is welded to the inside of the two main frames as seen at 12 to which the ball trailer hitch 13 is secured.

As is readily apparent from the above description, the hitch may be easily connected to bumpers having varying widths by loosening the nuts 11 and sliding the threaded stud 9 of the adjustable anchor within the slot 14 to accomodate a particular width. The nuts 11 are then tightened to provide a rigid connection.

From the above it will be obvious that I have invented a simple, practical and inexpensive hitch for automotive vehicles.

What I claim is:

1. A bumper hitch for a trailer adapted to be positioned on the front bumper of a vehicle comprising a vertical structural member which includes a top horizontal arm adapted to hook over the top of the bumper, a vertical slot in said vertical member, a bottom adjustable anchor adapted to hook under the bottom of the bumper and be drawn tight horizontally to secure the vertical member to the bumper, and a horizontal projection on the opposite side of said vertical structure member from said arm and anchor supporting a ball trailer hitch, said bottom adjustable anchor being formed by an upturned angle secured to a threaded stud projecting through said slot.

2. A bumper hitch as set forth in claim 1 including a pad secured to said vertical structural member adapted to engage the front of the bumper and prevent damaging the bumper finish as said bottom adjustable anchor is tightened.

3. A bumper hitch as set forth in claim 2 wherein said pad is in the form a wood block which may be vertically adjustably positioned on said vertical structural member.

4. A bumper hitch as set forth in claim 1 wherein said vertical structural member is formed of two horizontally spaced angles forming said slot.

5. A bumper hitch as set forth in claim 4 wherein said top horizontal arm is formed by bending one leg of each angle horizontally, the other leg beyond such bend being cut away.

* * * * *